(12) United States Patent
Zhu et al.

(10) Patent No.: US 12,433,303 B2
(45) Date of Patent: Oct. 7, 2025

(54) COTTON CANDY MACHINE WITH AIR SUPPLY MECHANISM

(71) Applicant: GUANGZHOU SUNZEE INTELLIGENT TECHNOLOGY CO., LTD, Guangdong (CN)

(72) Inventors: Fangpin Zhu, Guangdong (CN); Yaoji Li, Guangdong (CN)

(73) Assignee: GUANGZHOU SUNZEE INTELLIGENT TECHNOLOGY CO., LTD, Guangzhou (CN)

( * ) Notice: Subject to any disclaimer, the term of this patent is extended or adjusted under 35 U.S.C. 154(b) by 76 days.

(21) Appl. No.: 18/625,973

(22) Filed: Apr. 3, 2024

(65) Prior Publication Data

US 2024/0341322 A1    Oct. 17, 2024

Related U.S. Application Data

(63) Continuation of application No. PCT/CN2023/134320, filed on Nov. 27, 2023.

(30) Foreign Application Priority Data

Apr. 14, 2023  (CN) .......................... 202320841616.6
Apr. 14, 2023  (CN) .......................... 202320841970.9
Jun.  9, 2023  (CN) .......................... 202321477036.X

(51) Int. Cl.
  *A23G 3/10*         (2006.01)
(52) U.S. Cl.
  CPC ..................................... *A23G 3/10* (2013.01)

(58) Field of Classification Search
  CPC ........... A23G 3/0051; A23G 3/10; A23G 7/00
  See application file for complete search history.

(56) References Cited

FOREIGN PATENT DOCUMENTS

| CN | 213881633 U | 8/2021 |
| CN | 216438473 U | 5/2022 |
| CN | 218115156 U | 12/2022 |
| CN | 219205809 U | 6/2023 |
| CN | 219228915 U | 6/2023 |
| CN | 220292967 U | 1/2024 |

OTHER PUBLICATIONS

International search report of PCT/CN2023/134320.

*Primary Examiner* — James Sanders

(57) ABSTRACT

The present disclosure relates to a cotton candy machine with an air supply mechanism, including a cabinet body and the air supply mechanism, wherein a furnace head mechanism is disposed inside the cabinet body, and a sugar making chamber is provided above the furnace head mechanism; the air supply mechanism includes a fan, which is located inside the cabinet body to draw the air outside the cabinet body into the cabinet body; the air inside the cabinet body blows towards the furnace head mechanism and flows through same; and the air inside the furnace head mechanism flows towards the sugar making chamber. which can not only dissipate heat inside the cabinet body and furnace head mechanism of the cotton candy machine, but also make the air pressure in the sugar making chamber large enough, and spun sugar models made are not affected by the height.

14 Claims, 12 Drawing Sheets

COTTON CANDY MACHINE WITH AIR SUPPLY MECHANISM

CROSS-REFERENCE TO RELATED APPLICATIONS

The present application is a continuation of International (PCT) Patent Application No. PCT/CN2023/134320, filed on Nov. 27, 2023, which based on three Chinese patent applications with application numbers: 202320841616.6 (on the filing date of Apr. 14, 2023), 202320841970.9 (on the filing date of Apr. 14, 2023), and 202321477036.X (on the filing date of Jun. 9, 2023), and claims the priority of the above three Chinese patent applications; and all or part of the contents of the three Chinese patent applications are incorporated herein by reference.

TECHNICAL FIELD

The present disclosure relates to the technical field of spun sugar processing equipment, and more particularly relates to a cotton candy machine with an air supply mechanism.

BACKGROUND

In the related technology, a cotton candy machine is a cabinet-type device for fully automatic production of spun sugar. The cotton candy machine inputs white sugar stored inside into a furnace head, the white sugar is heated by the furnace head and thus turns into sugar shreds, the furnace head rotates to throw the sugar shreds out of the furnace head, blades on an outer wall of the furnace head rotate synchronously to generate upward airflow, and the thrown sugar shreds are output upward, making the sugar shreds stick to a paper stick of a manipulator.

In order to improve the effect of upward output of sugar shreds, a fan is often added to increase the upward output air pressure. For the specific structure, please refer to the technical solution with patent application number 202120335512.9, which discloses a temperature and humidity adjustment device, belonging to the field of spun sugar processing equipment. The temperature and humidity adjustment device includes a chassis, a circulation fan and an air duct; the circulation fan is fixedly connected to the air duct, and the air duct is fixedly connected to the chassis; the air duct is provided with an input end, an output end and a plurality of exhaust ends, and the input end is communicated with an air outlet of the circulation fan; the circulation fan is also provided with an exhaust vent, the exhaust vent is located at one end of the chassis, and the output end is located at the other end of the chassis; the exhaust vent and the output end are both communicated with an interior of the chassis; and the plurality of exhaust ends are communicated with the outside of the chassis.

According to the above solution, a furnace cover is disposed at an outer side of the furnace head, and the output end of the air duct is located on a lower side of the furnace cover; the air sucked from an upper side of the furnace cover by the circulation fan enters the air duct and is then output again through the output end of the air duct; the furnace cover is spaced apart from the furnace head, that is, there is a spacing therebetween; and the air output from the air duct flows upward through the spacing, driving the sugar shreds thrown out of the furnace head to output upwards. However, in practical use, this structure cannot provide heat dissipation for interiors of a cabinet body and a sugar making chamber, and a heat dissipation device needs to be additionally disposed inside the furnace head for the heat dissipation therein so as to ensure that the cotton candy machine can effectively make sugar within a stable temperature and humidity range. Furthermore, the air pressure generated by this structure is relatively small, and the height of sugar making is limited. The airflow cannot be blown upward in a more centralized manner, and thus the stability of sugar making cannot be guaranteed, so that a spun sugar model made is limited.

SUMMARY

In order to overcome the problems in the related technology, the present disclosure provides a cotton candy machine with an air supply mechanism, which can not only dissipate heat inside a furnace head mechanism and a cabinet body, but also enable the airflow to be blown upward in a centralized manner, thus implementing effective and stable sugar making.

The present disclosure provides a cotton candy machine with an air supply mechanism, including a cabinet body and the air supply mechanism, where a furnace head mechanism is disposed inside the cabinet body, and a sugar making chamber is provided above the furnace head mechanism;
the air supply mechanism includes a fan, which is located inside the cabinet body to draw the air outside the cabinet body into the cabinet body; the air inside the cabinet body blows towards the furnace head mechanism and flows through same; and the air inside the furnace head mechanism flows towards the sugar making chamber and finally flows out of the sugar making chamber.

Preferably, the furnace head mechanism is installed inside the cabinet body by means of a mounting plate, and the mounting plate is provided with openings, which are communicated with an interior of the furnace head mechanism; and the air inside the cabinet body enters the interior of the furnace head mechanism through the openings to dissipate heat from components inside the furnace head mechanism, and takes away the heat inside the furnace head mechanism at the same time.

Preferably, the mounting plate is provided with a plurality of support columns, a protective cover is provided outside the plurality of support columns, the protective cover encloses the components inside the furnace head mechanism, and the protective cover is provided with a plurality of slots; and the air inside the furnace head mechanism flows out from the slots and toward the sugar making chamber.

Preferably, the cabinet body is internally provided with a first inner chamber and a second inner chamber, the first inner chamber and the second inner chamber are partitioned from each other by a body plate, and the second inner chamber is communicated with the sugar making chamber; and the fan is disposed inside the first or second inner chamber, and the furnace head mechanism is disposed inside the second inner chamber.

Preferably, a circuit board and electronic components of the cotton candy machine are disposed inside the first inner chamber, and the first inner chamber is provided with outer side plates, which encapsulate the circuit board and the electronic components; and the outer side plate is provided with a mesh, and the outside air enters the first inner chamber through the mesh, which allows the first inner chamber to be fully filled with the air, so that the heat in the first inner chamber is taken away by air flowing.

Preferably, a through hole is reserved in an upper end of the second inner chamber, and the through hole is communicated with the sugar making chamber; and the air from the second inner chamber is blown towards the sugar making chamber through the through hole.

Preferably, the first inner chamber encloses the second inner chamber; or the first inner chamber and the second inner chamber are disposed left and right, and are partitioned from each other by the body plate; or the first inner chamber and the second inner chamber are disposed up and down, and are partitioned from each other by the body plate.

Preferably, the furnace head mechanism includes a bearing fixing seat, a furnace head, a main shaft, and a feed delivery pipe, where the bearing fixing seat is mounted on the mounting plate, the main shaft is a hollow shaft, and the main shaft is rotatably penetrated into the bearing fixing seat; an upper end of the main shaft passes through the bearing fixing seat and the mounting plate; an opening is reserved in the upper end of the main shaft, and the furnace head is mounted on the upper end of the main shaft; and the feed delivery pipe is disposed inside the main shaft in a penetrating manner.

Preferably, an upper end of the feed delivery pipe penetrates through the opening reserved in the upper end of the main shaft or is flush therewith, so that the feed delivery pipe is communicated with an interior of the furnace head; and a lower end of the feed delivery pipe penetrates out of the bearing fixing seat.

Preferably, a heating plate is mounted at upper ends of the plurality of support columns, the heating plate is sleeved outside the main shaft by means of a bearing, and the heating plate is located below the furnace head.

Preferably, a plurality of blades are detachably installed on an outer wall of the furnace head, and each of the blades is obliquely installed on the outer wall of the furnace head; and when the main shaft drives the furnace head to rotate, the plurality of blades rotate along with the furnace head to strengthen air flowing, so that a uniform and centralized upward vortex airflow is formed at an outer side of the furnace head mechanism.

Preferably, a collector ring is disposed on the main shaft in a manner of sleeved joint, and the collector ring is located below the heating plate and connected to the heating plate.

Preferably, the second inner chamber is provided with a partition, which divides the second inner chamber into a large chamber and a small chamber, and the furnace head mechanism is disposed in the large chamber.

Preferably, the cotton candy machine further includes a sugar supply mechanism; the sugar supply mechanism includes at least one sugar box, an airway, a feeder, and an air pump; the lower end of the feed delivery pipe extends into the small chamber and is communicated with the airway; the sugar box is mounted inside the small chamber, and is communicated with one end of the airway by means of the feeder, and an air inlet is reserved at the other end of the airway; and the air inlet is communicated with the air pump by means of a pipeline.

Preferably, the cabinet body is provided with a working surface, the working surface is covered with a cover body, the cover body and the working surface are enclosed to form the sugar making chamber, and the furnace head mechanism is at least partially exposed in the sugar making chamber.

Preferably, the cotton candy machine further includes a cleaning mechanism, and the cleaning mechanism includes a clear water bottle, a sewage bottle and a water pump; the water pump is connected to the clear water bottle, and an output end of the water pump is connected to the lower end of the feed delivery pipe by means of a water outlet pipe; the clear water in the clear water bottle is pumped into the feed delivery pipe by means of the water pump, and then sprayed upward into the furnace head by means of the air pump;

the working surface is provided with a disc body, and the disc body at least partially extends into the through hole and is enclosed outside the furnace head mechanism; the disc body is provided with a water receiving tank, and the water receiving tank is connected to the sewage bottle by means of a water return pipe; and the water thrown out by the furnace head at high speed is received by the disc body, then flows to the water receiving tank, and then flows to the sewage bottle through the water return pipe for collection.

Preferably, the cotton candy machine further includes a manipulator mechanism, and the manipulator mechanism includes a mounting seat, a first rotating motor, a socket and a stick; the mounting seat is mounted on the working surface, and the mounting seat is connected to the first rotating motor by means of a rotating shaft, so that the first rotating motor can swing up and down relative to the mounting seat; and the socket is installed on an output shaft of the first rotating motor, and the stick is clamped on the socket.

Preferably, a second rotating motor is installed in a fixed seat, and the second rotating motor is mechanically connected to the rotating shaft; and the second rotating motor drives the rotating shaft to rotate, thereby driving the first rotating motor to swing.

Preferably, a driving assembly is installed on the mounting plate, and the driving assembly includes a drive motor, a driving wheel, and a driven wheel; the drive motor is installed on a bottom surface of the mounting plate, and an output shaft of the drive motor penetrates the mounting plate upward; the driving wheel is installed on the output shaft of the drive motor and is located on a top surface of the mounting plate; the driven wheel is sleeved outside the main shaft, and the driven wheel is located below the collector ring; and the driving wheel is connected to the driven wheel by means of a belt in a transmission manner.

The technical solution provided by the present disclosure may include the following beneficial effects: according to the cotton candy machine with the air supply mechanism, the fan is configured to draw the outside air into the cabinet body for heat dissipation, the air then flows through the interior of the furnace head mechanism to dissipate heat inside the furnace head mechanism, and finally, the air is blown to the sugar making chamber for sugar making and then discharged out of the sugar making chamber. The cotton candy machine with the air supply mechanism can not only dissipate heat inside the cabinet body and furnace head mechanism of the cotton candy machine, but also make the air pressure in the sugar making chamber large enough; and the air is blown towards the sugar making chamber in a centralized manner, and then discharged from the top of the sugar making chamber, so that the sugar making is ensured to be effective and stable, and the spun sugar model made is not affected by the height.

It should be understood that the above general description and the subsequent detailed description are only illustrative and explanatory, and cannot not be understood as a limitation of the present disclosure.

BRIEF DESCRIPTION OF THE DRAWINGS

The above and other objects, features and advantages of the present disclosure will become more apparent by describing in more detail exemplary embodiments of the present disclosure with reference to the accompanying drawings, where the same reference numerals generally denote the same parts throughout the exemplary embodiments of the present disclosure.

DETAILED DESCRIPTION OF THE EMBODIMENTS

Figure 1:
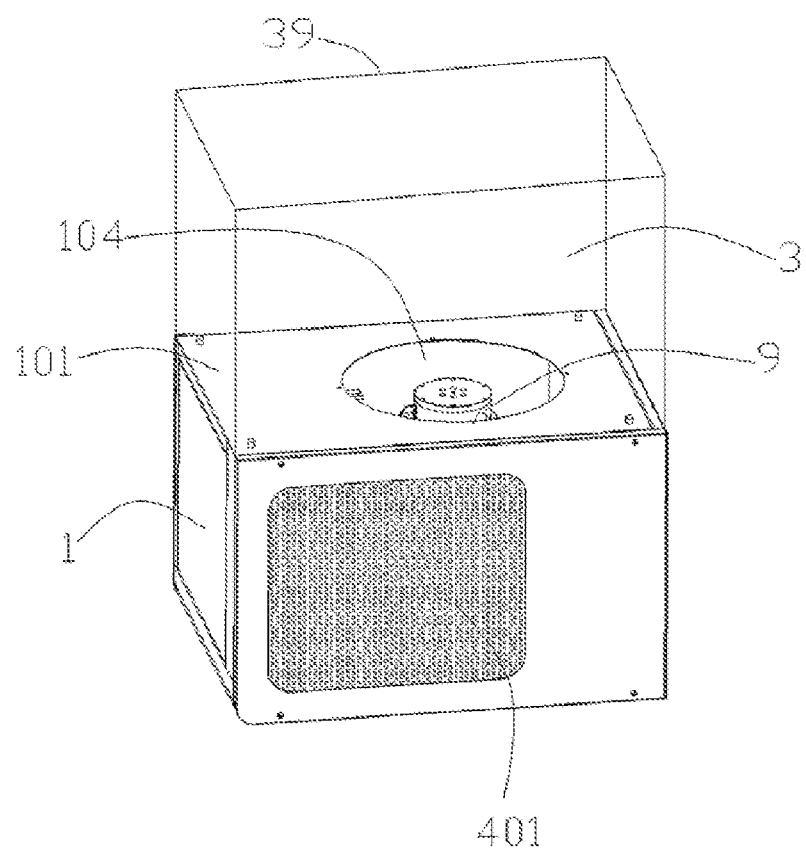
FIG. 1 is a three-dimensional view of a cotton candy machine with an air supply mechanism according to the present disclosure.

Preferred embodiments of the present disclosure will be described in more detail below with reference to the accompanying drawings. Although the preferred embodiments of the present disclosure are shown in the drawings, it should be understood that the present disclosure may be implemented in various forms and should not be limited to the embodiments set forth herein. On the contrary, these embodiments are provided to make the present disclosure more thorough and complete, and to fully convey the scope of the present disclosure to those skilled in the art.

The terms used in the present disclosure are solely for the purpose of describing specific embodiments, and are not intended to limit the present disclosure. As used in the present disclosure and the appended claims, the singular forms of "one", "the", and "said" are intended to include the plural forms as well, unless the context clearly dictates otherwise. It will also be understood that the term "and/or" as used herein refers to and includes any and all possible combinations of one or more of the associated listed items.

It should be understood that although the terms "first", "second", "third", etc. may be used in the present disclosure to describe various information, the information should not be limited to these terms. These terms are only used to distinguish information of the same type from each other. For example, without departing from the scope of the present disclosure, the first information may also be referred to as the second information, and similarly, the second information may also be referred to as the first information. Therefore, the features defined as the "first" and the "second" may explicitly or implicitly include one or more of these features. In the description of the present disclosure, "the plurality of" means two or more, unless otherwise explicitly and specifically defined.

The technical solutions of the embodiments of the present disclosure are described in detail below with reference to the accompanying drawings.

Figure 2:
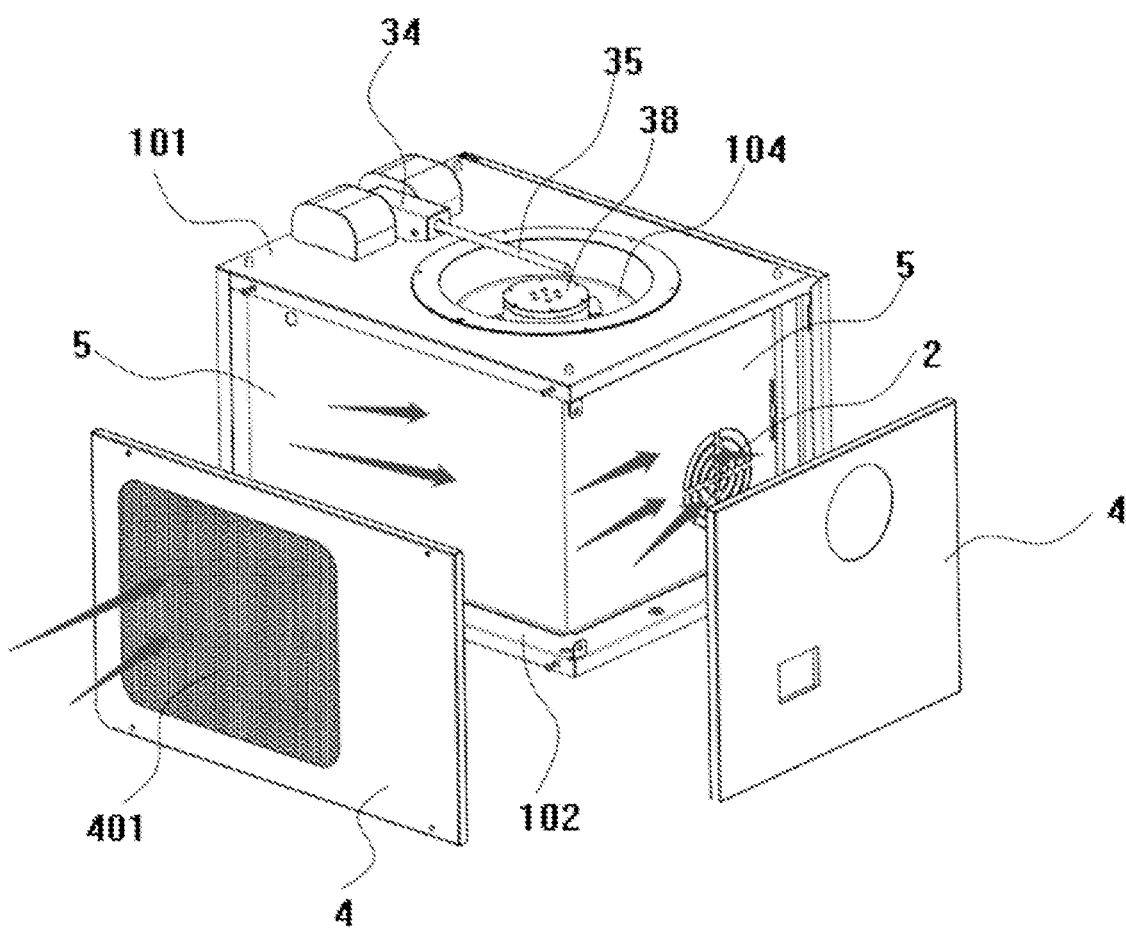
FIG. 2 is a partial exploded view of the cotton candy machine with the air supply mechanism according to the present disclosure.
Figure 3:
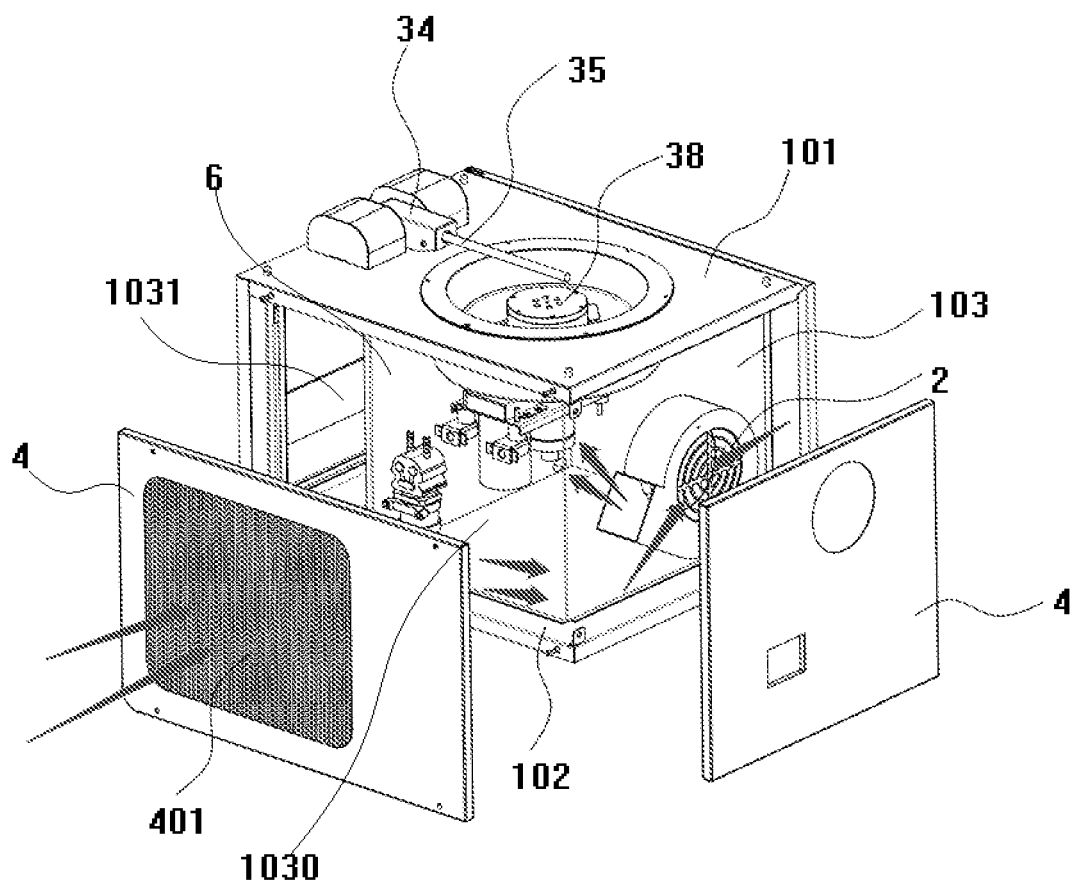
FIG. 3 is an internal structure diagram of a body plate in FIG. 2 in perspective.

Referring to FIG. 1 to FIG. 3, the present disclosure provides a cotton candy machine with an air supply mechanism, which includes a cabinet body 1, a furnace head mechanism, the air supply mechanism, a cleaning mechanism, a sugar supply mechanism, and a manipulator mechanism, where the furnace head mechanism, the air supply mechanism, the cleaning mechanism and the sugar supply mechanism are disposed inside the cabinet body 1, and the manipulator mechanism is disposed outside the cabinet body 1.

Specifically, a working surface 101 is provided on a top of the cabinet body 1, the working surface 101 is covered with a cover body 39, the cover body 39 and the working surface 101 are enclosed to form a sugar making chamber 3, and the furnace head mechanism is at least partially exposed in the sugar making chamber 3, so that the sugar making chamber 3 is located above the furnace head mechanism. The manipulator mechanism is installed on the working surface 101 and is located inside the sugar making chamber 3. The cover body 39 may be either a transparent cover or an opaque cover, and is not limited thereto.

The air supply mechanism includes a fan 2, which is located inside the cabinet body 1 to draw the air outside the cabinet body 1 into the cabinet body 1 so as to dissipate heat inside cabinet body 1. At the same time, the air inside the cabinet body blows towards the furnace head mechanism and flows through same so as to dissipate heat inside the furnace head mechanism, effectively reducing the failure rate of the furnace head mechanism; and furthermore, there is no need to add an additional heat dissipation device to dissipate heat from the furnace head mechanism, which optimizes the structure of the cotton candy machine and reduces the machine production cost.

After the air inside the furnace head mechanism flows out, it flows together with other air inside the cabinet body 1 towards the sugar making chamber 3 in a centralized manner, and is then blown upwards in a centralized manner, which makes the sugar making effective and stable. Then, it flows out of the sugar making chamber 3, making a sugar making model uncontrollable.

In this embodiment, the air inside the sugar making chamber 3 flows out from a top of the sugar making chamber 3, allowing the air inside the sugar making chamber 3 to be blown upward in a more centralized manner, which makes sugar making more stable and efficient. Furthermore, in this embodiment, the air inside cabinet body 1 has only one channel to flow out from the inside of the furnace head mechanism or the outside of the furnace head mechanism to the sugar chamber 3, resulting in a higher air pressure on the outside of the furnace head mechanism and a more centralized upward blowing of sugar shreds thrown out by the furnace head mechanism, so that a spun sugar model made by the manipulator mechanism is allowed to be more stable and diverse.

It can be understood that, in other embodiments, the air in the sugar making chamber 3 may also flow out from other places of the sugar making chamber 3, such as from the side, or from the top and the side at the same time, which is not limited thereto.

The air supply mechanism of the cotton candy machine is formed by the fan 2, and the airflow flows to the inside of the furnace head mechanism, which not only improves the heat dissipation of the furnace head mechanism, and prolongs the service life thereof, but also greatly reduces the machine production cost.

In a preferred embodiment, the cabinet body 1 is internally provided with a first inner chamber 102 and a second inner chamber 103, the first inner chamber 102 and the second inner chamber 103 are partitioned from each other by a body plate 5, and the second inner chamber 103 is communicated with the sugar making chamber 3. The fan 2 is disposed inside the first inner chamber 102 to draw the external air into the first inner chamber 102; and the furnace head mechanism is disposed inside the second inner chamber 103.

Figure 4:
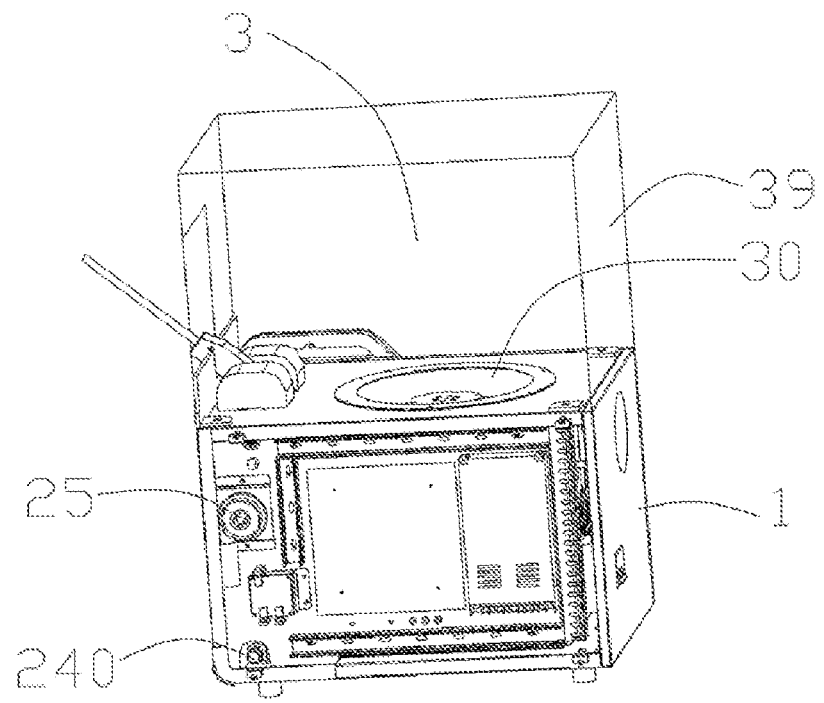
FIG. 4 is a three-dimensional view of the cotton candy machine with the air supply mechanism according to the present disclosure.

Referring to FIG. 4, it is worth noting that a circuit board and electronic components of the cotton candy machine are disposed inside the first inner chamber 102, and the airflow from the first inner chamber 102 passes through the circuit board and the electronic components for providing heat dissipation therefor.

Referring to FIG. 2 to FIG. 4, further, the first inner chamber 102 is provided with outer side plates 4, which encapsulate the circuit board and the electronic components, so as to avoid exposure of the circuit board and the electronic component. The outer side plate 4 is provided with a mesh 401, and the outside air enters the first inner chamber 102 through the mesh 401, which allows the first inner chamber 102 to be fully filled with the air, so that the heat in the first inner chamber 102 is taken away by air flowing, and the heat dissipation in the first inner chamber 102 is further achieved.

In another preferred embodiment, the first inner chamber 102 is communicated with the second inner chamber 103 by means of the fan 2, and the fan 2 is located in the second inner chamber 103 and draws the air from the first inner chamber 102 into the second inner chamber 103. A through hole 104 is reserved in an upper end of the second inner chamber 103, and the through hole 104 is communicated with the sugar making chamber 3; and the air from the second inner chamber 103 is blown towards the sugar making chamber 3 through the through hole 104.

In this embodiment, the first inner chamber 102 is "L"-shaped and encloses the second inner chamber 103. The external air first passes through the first inner chamber 102 to sufficiently dissipate heat from the components in the first inner chamber 102, and then is drawn into the second inner chamber 103 by the fan 2. It can be understood that, in other embodiments, the first inner chamber 102 and the second inner chamber 103 may be disposed left and right, and partitioned from each other by the body plate 5; or the first inner chamber 102 and the second inner chamber 103 may be disposed up and down, and partitioned from each other by the body plate 5, which is not limited thereto.

In this embodiment, an air duct of the air supply mechanism is formed by the first inner chamber 102, the second inner chamber 103, the fan 2, the furnace head mechanism and the sugar making chamber 3. First of all, the cotton candy machine is started, and the furnace head mechanism starts to rotate while raising the sugar making temperature in the furnace head mechanism; and when the sugar making temperature is reached, sugar shreds are thrown out, and sugar making is started. At the same time, the fan 2 is started to draw the external air from the mesh 401 into the first inner chamber 102, the external air is enabled to enter the second chamber 103 by the fan 2 and then blown from the through hole 104 to the sugar making chamber 3, so that the sugar shreds thrown out by the furnace head mechanism are blown upward in a centralized manner and wound on the manipulator mechanism, and thus form a spun sugar model.

In addition, the second inner chamber 103 is provided with a partition 6, which divides the second inner chamber 103 into a large chamber 1030 and a small chamber 1031, where the furnace head mechanism and the cleaning mechanism are disposed in the large chamber 1030, and the sugar supply mechanism is disposed in the small chamber 1031.

Figure 7:
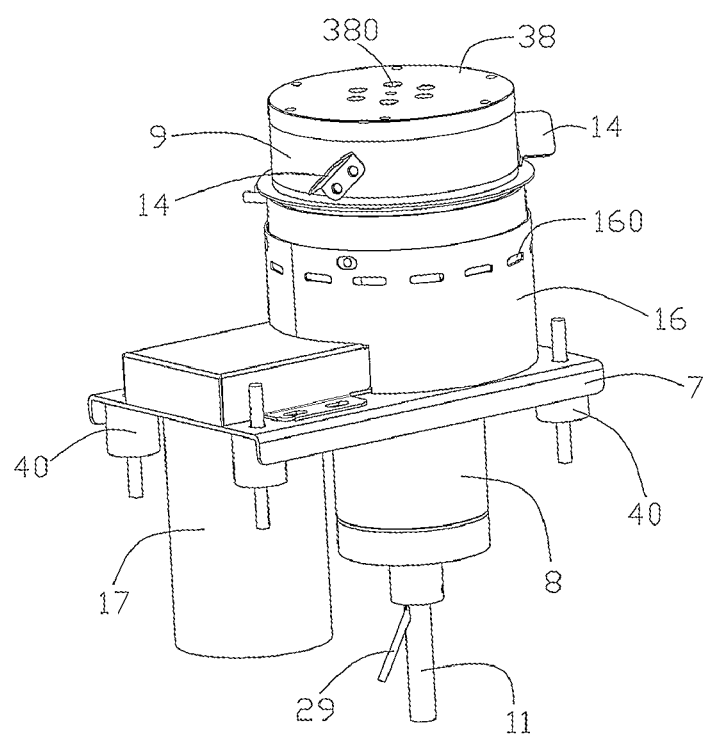
FIG. 7 is a three-dimensional view of a furnace head mechanism according to the present disclosure.
Figure 8:
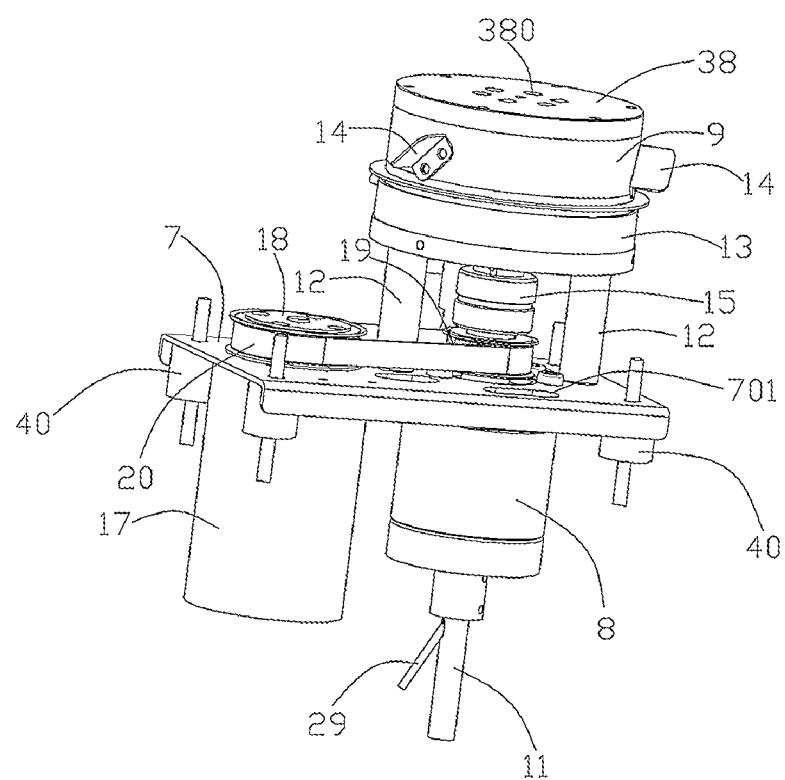
FIG. 8 is another three-dimensional view of the furnace head mechanism according to the present disclosure.
Figure 9:
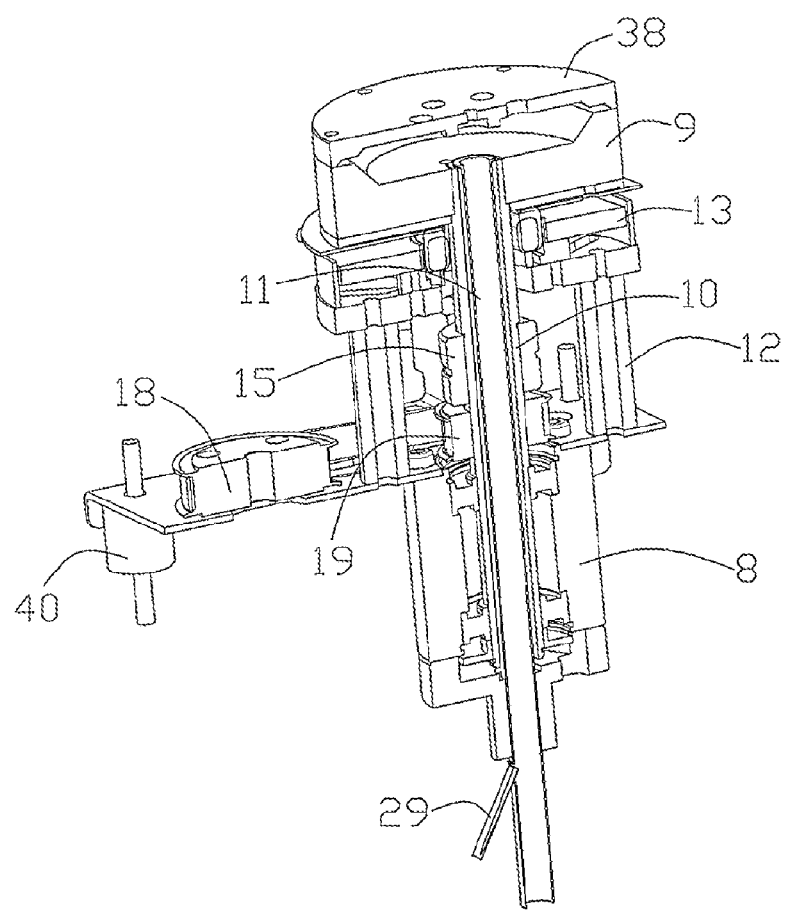
FIG. 9 is a cross-sectional view of the furnace head mechanism according to the present disclosure.

Referring to FIG. 7 to FIG. 9, in a preferred embodiment, the furnace head mechanism is installed inside the large chamber 1030 by means of a mounting plate 7, and the mounting plate 7 is provided with a plurality of openings 701, which are communicated with an interior of the furnace head mechanism; and the air inside the cabinet body 1 enters the interior of the furnace head mechanism through the openings 701 to dissipate heat from the components inside the furnace head mechanism, and takes away the heat inside the furnace head mechanism at the same time, thereby achieving the heat dissipation in the furnace head mechanism.

The furnace head mechanism includes a bearing fixing seat 8, a furnace head 9, a main shaft 10, and a feed delivery pipe 11, where the bearing fixing seat 8 is mounted on a bottom face of the mounting plate 7, the main shaft 10 is a hollow shaft and is rotatably penetrated into the bearing fixing seat 8; an upper end of the main shaft 10 passes through the bearing fixing seat 8 and the mounting plate 7; an opening is reserved in the upper end of the main shaft 10, and the furnace head 9 is mounted on the upper end of the main shaft 10; and the feed delivery pipe 11 is disposed inside the main shaft 10 in a penetrating manner, and an outer wall of the feed delivery pipe 11 is not in contact with an inner wall of the main shaft 10, which effectively avoids the damage to the feed delivery pipe 11 caused by a friction between the main shaft 10 and the feed delivery pipe 11 during rotation, and thus reduces the failure rate. An upper end of the feed delivery pipe 11 penetrates through the opening reserved in the upper end of the main shaft 10 or is flush therewith, so that the feed delivery pipe 11 is ensured to be communicated with an interior of the furnace head 9, making it easy for the feed delivery pipe 11 to feed sugar to the interior of the furnace head 9. A lower end of the feed delivery pipe 11 penetrates out of the bearing fixing seat 8 for connection with the cleaning mechanism and the sugar supply mechanism.

Further, the mounting plate 7 is provided with a plurality of support columns 12 on a top face, a heating plate 13 is mounted at upper ends of the plurality of support columns 12, the heating plate 13 is sleeved outside the main shaft 10 by means of a bearing, and the heating plate 13 is located below the furnace head 9. The furnace head 9 is heated by the heating plate 13, so that the sugar entering the furnace head 9 is melted. The heating plate 13 is an electromagnetic heating plate or an electric heating wire heating plate.

A plurality of blades 14 are detachably installed on an outer wall of the furnace head 9, and each of the blades 14 is "L"-shaped and is obliquely installed on the outer wall of the furnace head 9, which improves the air blowing or suction performance of the blades 14. When the main shaft 10 drives the furnace head 9 to rotate, the plurality of blades 14 rotate along with the furnace head 9 to strengthen air flowing, so that a uniform and centralized upward vortex airflow is formed at an outer side of the furnace head mechanism, allowing the sugar making to be more stable and efficient. A furnace lid 38 is installed on a top of the furnace head 9, and sugar outlet holes 380 are reserved in the furnace lid 38.

In this embodiment, due to the arrangement of the bearing fixing seat 8 on the bottom face of the mounting plate 7, the arrangement of the furnace head 9 on the upper end of the main shaft 10, and the cooperation of the suspended heating plate 13, the distance between the furnace head 9 and the bearing fixing seat 8 as well as the distance between the bearing fixing seat 8 and the heating plate 13 are relatively large. Moreover, the airflow is drawn out from bottom to top by the plurality of blades 14 on the outer wall of the furnace head 9, and the high-temperature heat airflow is less in contact heat exchange with the bearing fixing seat 8, which effectively prevents the bearing fixing seat 8 from being damaged due to being heated for a long time, and thus prolongs the service life of the bearing fixing seat.

In addition, a thermocouple is installed inside the furnace head 9 to detect the temperature therein. A collector ring 15 is disposed on the main shaft 10 in a manner of sleeved joint, and the collector ring 15 is located below the heating plate 13 and connected to the heating plate 13. The collector ring 15 provides current commutation for the thermocouple. A protective cover 16 is provided outside the plurality of support columns 12, the protective cover 16 encloses the components (the collector ring 15 and the driven wheel 19) inside the furnace head mechanism, and the protective cover 16 is provided with a plurality of slots 160; and the air inside the furnace head mechanism flows out from the slots 160 and toward the sugar making chamber 3 through the through hole 104.

Referring to FIG. 3, and FIG. 7 to FIG. 9, when the air enters the second inner chamber 103 from the first inner chamber 102, it will be blown into the interior of the furnace head mechanism through the openings 701 in the mounting plate 7 and thus takes away the heat inside the furnace head mechanism, then flows out of the slots 160 in the protective cover 16, and finally flows through the through hole 104 to the sugar making chamber 3 and is then discharged from the top of the sugar making chamber 3 to the outside of the machine.

A driving assembly is installed on the mounting plate 7, and the driving assembly includes a drive motor 17, a driving wheel 18, and a driven wheel 19; and the drive motor 17 is installed on a bottom surface of the mounting plate 7, and an output shaft of the drive motor 17 penetrates the mounting plate 7 upward. The driving wheel 18 is installed on the output shaft of the drive motor 17 and is located on a top surface of the mounting plate 7; and the driven wheel 19 is sleeved outside the main shaft 10, and the driven wheel 19 is located below the collector ring 15. The driving wheel 18 is connected to the driven wheel 19 by means of a belt 20 in a transmission manner. The drive motor 17 is configured to drive the driving wheel 18 to rotate, which drives the driven wheel 19 to rotate, thereby driving the main shaft 10 to rotate, and then further driving the furnace head 9 to rotate; and therefore, the melted syrup is thrown out. In addition, shock absorbers 40 are installed at all four corners of mounting plate 7, which effectively reduces the vibration generated by the furnace head mechanism during high-speed rotation after the furnace head mechanism is installed inside cabinet body 1.

Figure 5:
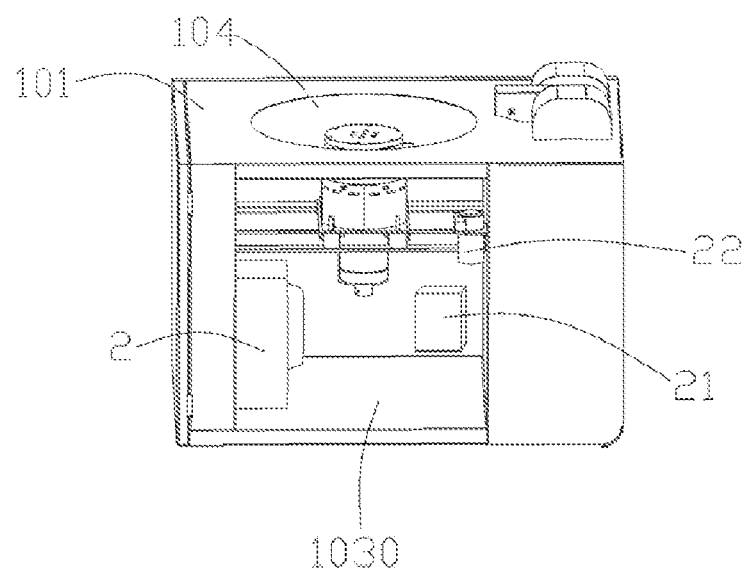
FIG. 5 is a schematic diagram of the partial internal structure of the cotton candy machine with the air supply mechanism according to the present disclosure.

Referring to FIG. 5, in addition, the large chamber 1030 is also internally provided with a humidifier 21 and a temperature and humidity sensor 22.

Figure 6:
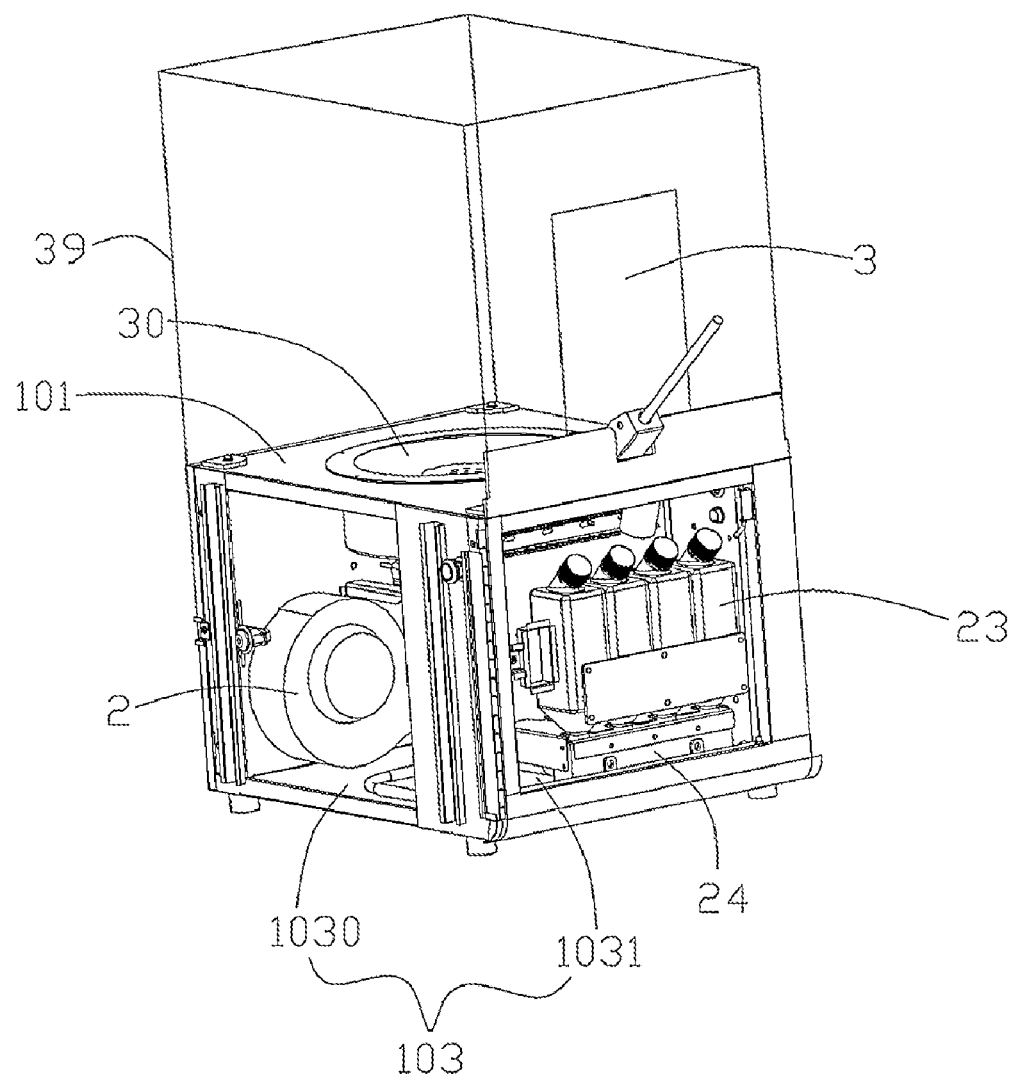
FIG. 6 is a schematic diagram of the internal structure of the cotton candy machine with the air supply mechanism according to the present disclosure.

Referring to FIG. 4, FIG. 6, FIG. 8, and to FIG. 9, the sugar supply mechanism includes at least one sugar box 23, an airway 24, a feeder, and an air pump 25, where the lower end of the feed delivery pipe 11 extends into the small chamber 1031 and is communicated with the airway 24; the sugar box 23 is mounted inside the small chamber 1031, and is communicated with one end of the airway 24 by means of the feeder, and an air inlet 240 is reserved at the other end of the airway 24; and the air inlet 240 is communicated with the air pump 25 by means of a pipeline. The sugar in the sugar box 23 falls into the airway 24 through the feeder, and the air pump 25 blows the air into the airway 24 so as to spray the sugar into the feed delivery pipe 11; and the sugar passes through the heating plate 13 and is enabled to enter the furnace head 9 after being melted.

Figure 10:
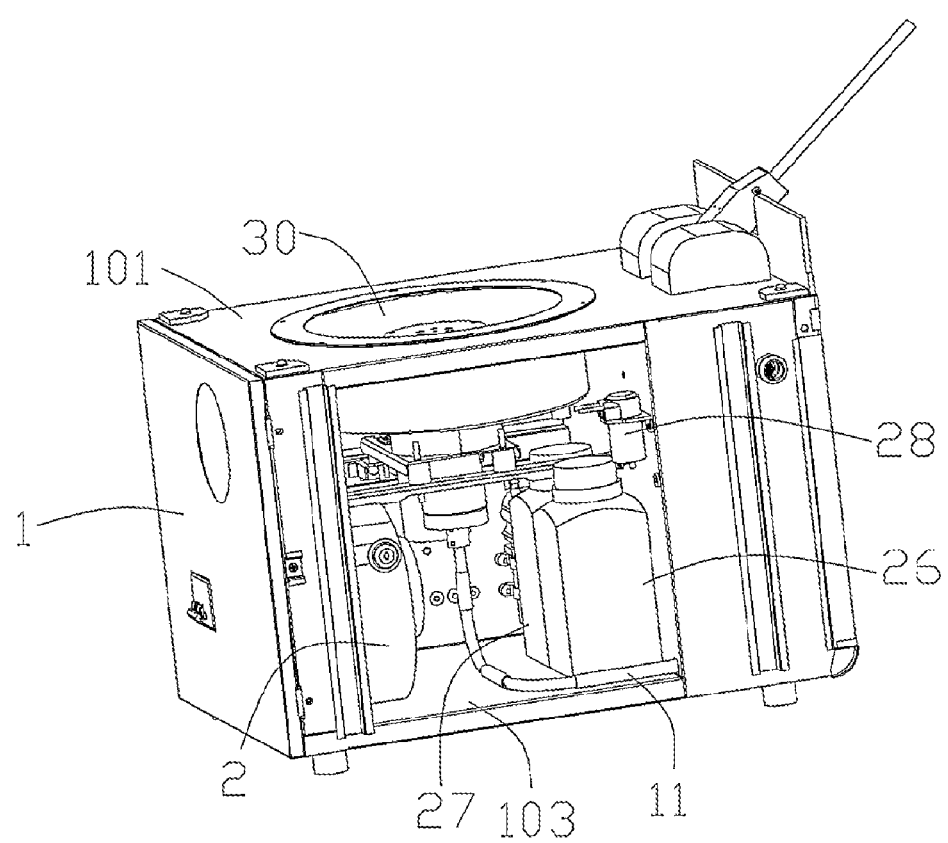
FIG. 10 is a schematic diagram of another internal structure of the cotton candy machine with the air supply mechanism according to the present disclosure.
Figure 11:
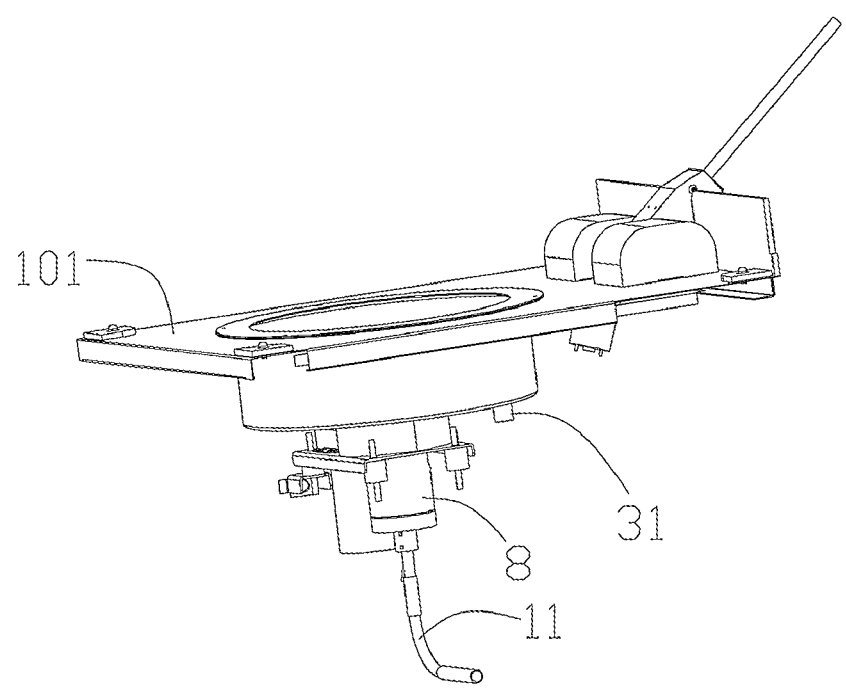
FIG. 11 is a schematic diagram of the connection structure between the furnace head mechanism and a manipulator mechanism according to the present disclosure.

Referring to FIG. 9 to FIG. 11, the cleaning mechanism includes a clear water bottle 26, a sewage bottle 27 and a water pump 28, where the water pump 28 is connected to the clear water bottle 26, and an output end of the water pump 28 is connected to the lower end of the feed delivery pipe 11 by means of a water outlet pipe 29; the clear water in the clear water bottle 26 is pumped into the feed delivery pipe 11 by means of the water pump 28, and then sprayed upward into the furnace head 9 by means of the air pump 25; and therefore, the cleaning mechanism can be both used to clean the furnace head 9 and to feed the clear water into the furnace head 9 during the production of spun sugar. Under the high-speed rotation of the furnace head 9, the clear water and the sugar are fused, improving the humidity of the sugar.

Figure 12:
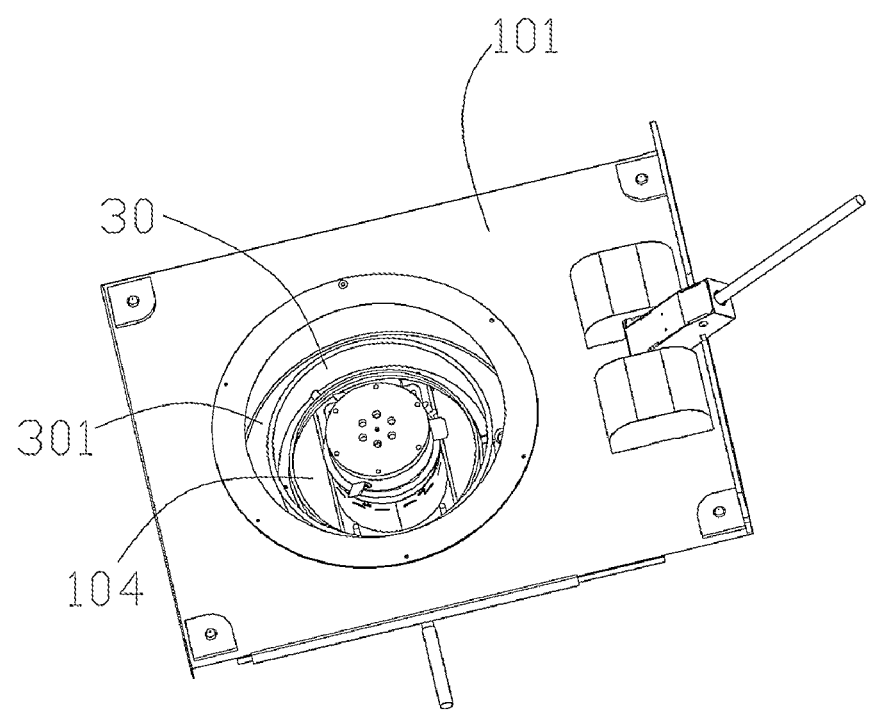
FIG. 12 is a top view of FIG. 11.

Referring to FIG. 10 to FIG. 12, the working surface 101 is provided with a disc body 30, and the disc body 30 at least partially extends into the through hole 104 and is enclosed outside the furnace head mechanism; and the disc body 30 is provided with a water receiving tank 301, and the water receiving tank 301 is connected to the sewage bottle 27 by means of a water return pipe 31. The water thrown out by the furnace head 9 at high speed is received by the disc body 30, then flows to the water receiving tank 301, and then flows to the sewage bottle 27 through the water return pipe 31 for collection.

Figure 13:
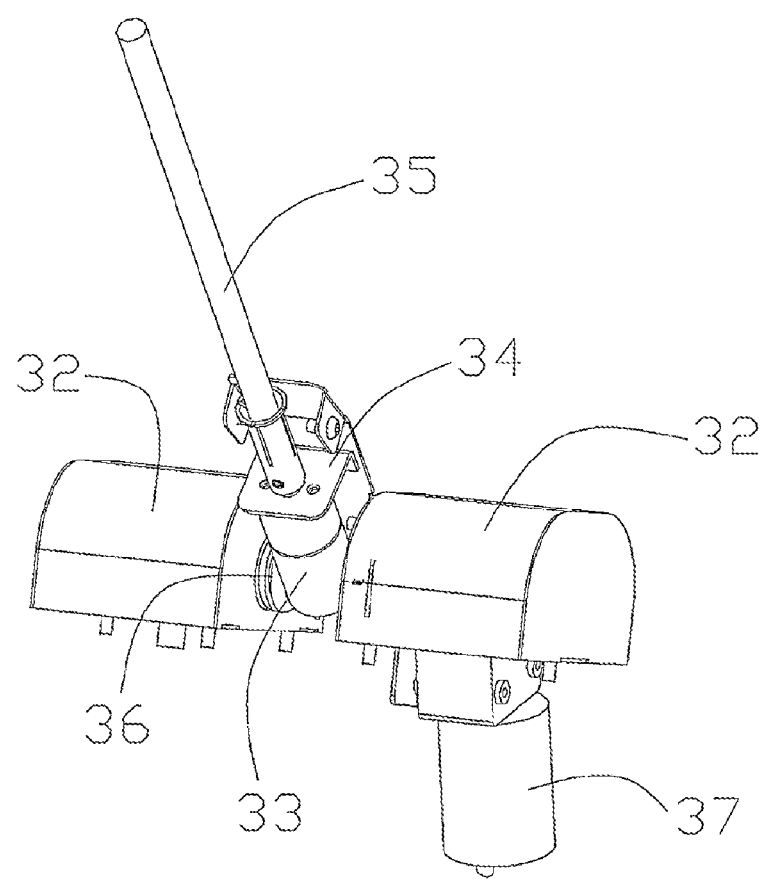
FIG. 13 is a three-dimensional view of the manipulator mechanism according to the present disclosure.

Referring to FIG. 10 and FIG. 13, the manipulator mechanism includes a mounting seat 32, a first rotating motor 33, a socket 34 and a stick 35; the mounting seat 32 is mounted on the working surface 101, and the mounting seat 32 is connected to the first rotating motor 33 by means of a rotating shaft 36, so that the first rotating motor 33 can swing up and down relative to the mounting seat 32; and therefore, the stick 35 can be conveniently swung above the furnace head 9 to wind the sugar shreds. The socket 34 is installed on an output shaft of the first rotating motor 33, and the stick 35 is clamped on the socket 34. Further, a second rotating motor 37 is installed in a fixed seat 32, and the second rotating motor 37 is mechanically connected to the rotating shaft 36; and the second rotating motor 37 drives the rotating shaft 36 to rotate, thereby driving the first rotating motor 33 to swing.

In a preferred embodiment, there are two mounting seats 32 installed on the working surface 101, which are connected to each other by means of the rotating shaft 36.

In summary, the technical solutions provided by the present disclosure have the following beneficial effects:

1. According to the cotton candy machine with the air supply mechanism, the fan 2 is configured to draw the outside air into the cabinet body 1 for performing heat dissipation on the cabinet body 1, the air then flows through the interior of the furnace head mechanism to dissipate heat inside the furnace head mechanism, and finally, the air is blown to the sugar making chamber 3 for sugar making and then discharged outside from the top of the sugar making chamber 3, which makes the air pressure in the sugar making chamber 3 large enough, ensuring that sugar making is effective and stable, and spun sugar models made are not affected by the height. In addition, it not only improves the heat dissipation of the furnace head mechanism, and prolongs the service life thereof, but also greatly reduces the machine production cost.

2. Due to the arrangement of the bearing fixing seat 8 on the bottom face of the mounting plate 7, the arrangement of the furnace head 9 on the upper end of the main shaft 10, and the cooperation of the suspended heating plate 13, the distance between the furnace head 9 and the bearing fixing seat 8 as well as the distance between the bearing fixing seat 8 and the heating plate 13 are relatively large. Moreover, the airflow is drawn out from bottom to top by the plurality of blades 14 on the outer wall of the furnace head 9, and the high-temperature heat airflow is less in contact heat exchange with the bearing fixing seat 8, which effectively prevents the bearing fixing seat 8 from being damaged due to being heated for a long time, and thus prolongs the service life of the bearing fixing seat.

3. The cleaning mechanism is configured to deliver clear water to the furnace head 9, which can be both used to clean the furnace head 9 and to feed the clear water into the furnace head 9 during the production of spun sugar. Under the high-speed rotation of the furnace head 9, the clear water and the sugar are fused, improving the humidity of the sugar. The interiors of the feed delivery pipe 11 and the furnace head 9 are humidified and cleaned, which effectively prevents malfunctions caused by clogging of the dried sugar shreds in the next use, and thus effectively reduces the failure rate.

The embodiments of the present disclosure have been described above. The above description is illustrative, not exhaustive, and is not limited to the disclosed embodiments. Many modifications and variations will be apparent to those skilled in the art without departing from the scope and spirit of the described embodiments. The terminology used herein is chosen to best explain the principles of the embodiments, their practical applications, or improvements to the technology in the market, or to enable others of ordinary skill in the art to understand the embodiments disclosed herein.

What is claimed is:

1. A cotton candy machine with an air supply mechanism, comprising a cabinet body and the air supply mechanism, wherein a furnace head mechanism is disposed inside the cabinet body, and a sugar making chamber is provided above the furnace head mechanism;

the air supply mechanism comprises a fan, which is located inside the cabinet body to draw the air outside the cabinet body into the cabinet body; the air inside the cabinet body blows towards the furnace head mechanism and flows through same; and the air inside the furnace head mechanism flows towards the sugar making chamber and finally flows out of the sugar making chamber;

wherein the furnace head mechanism is installed inside the cabinet body by means of a mounting plate, and the mounting plate is provided with openings, which are communicated with an interior of the furnace head mechanism; and the air inside the cabinet body enters the interior of the furnace head mechanism through the openings to dissipate heat from components inside the furnace head mechanism, and takes away the heat inside the furnace head mechanism at the same time; and the mounting plate is provided with a plurality of support columns, a protective cover is provided outside the plurality of support columns, the protective cover encloses the components inside the furnace head mechanism, and the protective cover is provided with a plurality of slots; and the air inside the furnace head mechanism flows out from the slots and toward the sugar making chamber; and the cabinet body is internally provided with a first inner chamber and a second inner chamber, the first inner chamber and the second inner chamber are partitioned from each other by a body plate, and the second inner chamber is communicated with the sugar making chamber; and the fan is disposed inside the first or second inner chamber, and the furnace head mechanism is disposed inside the second inner chamber; and a through hole is reserved in an upper end of the second inner chamber, and the through hole is communicated with the sugar making chamber; and the air from the second inner chamber is blown towards the sugar making chamber through the through hole; and the furnace head mechanism comprises a bearing fixing seat, a furnace head, a main shaft, and a feed delivery pipe, wherein the bearing fixing seat is mounted on the mounting plate, the main shaft is a hollow shaft, and the main shaft is rotatably penetrated into the bearing fixing seat; an upper end of the main shaft passes through the bearing fixing seat and the mounting plate; an opening is reserved in the upper end of the main shaft, and the furnace head is mounted on the upper end of the main shaft; and the feed delivery pipe is disposed inside the main shaft in a penetrating manner.

2. The cotton candy machine with the air supply mechanism according to claim 1, wherein a circuit board and electronic components of the cotton candy machine are disposed inside the first inner chamber, and the first inner chamber is provided with outer side plates, which encapsulate the circuit board and the electronic components; and the outer side plate is provided with a mesh, and the outside air enters the first inner chamber through the mesh, which allows the first inner chamber to be fully filled with the air, so that the heat in the first inner chamber is taken away by air flowing.

3. The cotton candy machine with the air supply mechanism according to claim 1, wherein the first inner chamber encloses the second inner chamber; or the first inner chamber and the second inner chamber are disposed left and right, and are partitioned from each other by the body plate; or the first inner chamber and the second inner chamber are disposed up and down, and are partitioned from each other by the body plate.

4. The cotton candy machine with the air supply mechanism according to claim 1, wherein an upper end of the feed delivery pipe penetrates through the opening reserved in the upper end of the main shaft or is flush therewith, so that the feed delivery pipe is communicated with an interior of the furnace head; and a lower end of the feed delivery pipe penetrates out of the bearing fixing seat.

5. The cotton candy machine with the air supply mechanism according to claim 1, wherein a heating plate is mounted at upper ends of the plurality of support columns, the heating plate is sleeved outside the main shaft by means of a bearing, and the heating plate is located below the furnace head.

6. The cotton candy machine with the air supply mechanism according to claim 1, wherein a plurality of blades are detachably installed on an outer wall of the furnace head, and each of the blades is obliquely installed on the outer wall of the furnace head; and when the main shaft drives the furnace head to rotate, the plurality of blades rotate along with the furnace head to strengthen air flowing, so that a uniform and centralized upward vortex airflow is formed at an outer side of the furnace head mechanism.

7. The cotton candy machine with the air supply mechanism according to claim 5, wherein a collector ring is disposed on the main shaft in a manner of sleeved joint, and the collector ring is located below the heating plate and connected to the heating plate.

8. The cotton candy machine with the air supply mechanism according to claim 1, wherein the second inner chamber is provided with a partition, which divides the second inner chamber into a large chamber and a small chamber, and the furnace head mechanism is disposed in the large chamber.

9. The cotton candy machine with the air supply mechanism according to claim 8, wherein the cotton candy machine further comprises a sugar supply mechanism; the sugar supply mechanism comprises at least one sugar box, an airway, a feeder, and an air pump; the lower end of the feed delivery pipe extends into the small chamber and is communicated with the airway; the sugar box is mounted inside the small chamber, and is communicated with one end of the airway by means of the feeder, and an air inlet is reserved at the other end of the airway; and the air inlet is communicated with the air pump by means of a pipeline.

10. The cotton candy machine with the air supply mechanism according to claim 9, wherein the cabinet body is provided with a working surface, the working surface is covered with a cover body, the cover body and the working surface are enclosed to form the sugar making chamber, and the furnace head mechanism is at least partially exposed in the sugar making chamber.

11. The cotton candy machine with the air supply mechanism according to claim 10, wherein the cotton candy machine further comprises a cleaning mechanism, and the cleaning mechanism comprises a clear water bottle, a sewage bottle and a water pump; the water pump is connected to the clear water bottle, and an output end of the water pump is connected to the lower end of the feed delivery pipe by means of a water outlet pipe; the clear water in the clear water bottle is pumped into the feed delivery pipe by means of the water pump, and then sprayed upward into the furnace head by means of the air pump;

the working surface is provided with a disc body, and the disc body at least partially extends into the through hole and is enclosed outside the furnace head mechanism; the disc body is provided with a water receiving tank, and the water receiving tank is connected to the sewage bottle by means of a water return pipe; and the water thrown out by the furnace head at high speed is received by the disc body, then flows to the water receiving tank, and then flows to the sewage bottle through the water return pipe for collection.

12. The cotton candy machine with the air supply mechanism according to claim 10, wherein the cotton candy machine further comprises a manipulator mechanism, and the manipulator mechanism comprises a mounting seat, a first rotating motor, a socket and a stick; the mounting seat is mounted on the working surface, and the mounting seat is connected to the first rotating motor by means of a rotating shaft, so that the first rotating motor can swing up and down relative to the mounting seat; and the socket is installed on an output shaft of the first rotating motor, and the stick is clamped on the socket.

13. The cotton candy machine with the air supply mechanism according to claim 12, wherein a second rotating motor is installed in a fixed seat, and the second rotating motor is mechanically connected to the rotating shaft; and the second rotating motor drives the rotating shaft to rotate, thereby driving the first rotating motor to swing.

14. The cotton candy machine with the air supply mechanism according to claim 7, wherein a driving assembly is installed on the mounting plate, and the driving assembly comprises a drive motor, a driving wheel, and a driven wheel; the drive motor is installed on a bottom surface of the mounting plate, and an output shaft of the drive motor penetrates the mounting plate upward; the driving wheel is installed on the output shaft of the drive motor and is located on a top surface of the mounting plate; the driven wheel is sleeved outside the main shaft, and the driven wheel is located below the collector ring; and the driving wheel is connected to the driven wheel by means of a belt in a transmission manner.

\* \* \* \* \*